United States Patent
Budd

(10) Patent No.: US 9,944,410 B1
(45) Date of Patent: Apr. 17, 2018

(54) SYSTEM AND METHOD FOR AIR LAUNCH FROM A TOWED AIRCRAFT

(71) Applicant: The United States of America, as Represented by the Administrator of NASA, Washington, DC (US)

(72) Inventor: Gerald D Budd, Lancaster, CA (US)

(73) Assignee: The United States of America as Represented by the Administrator of the National Aeronautics and Space Administration, Washington, DC (US)

(*) Notice: Subject to any disclaimer, the term of this patent is extended or adjusted under 35 U.S.C. 154(b) by 149 days.

(21) Appl. No.: 15/046,789

(22) Filed: Feb. 18, 2016

Related U.S. Application Data

(63) Continuation-in-part of application No. 13/573,920, filed on Mar. 14, 2013.

(60) Provisional application No. 62/120,590, filed on Feb. 25, 2015.

(51) Int. Cl.
| | | |
|---|---|---|
| *B64G 1/00* | (2006.01) | |
| *B64D 3/00* | (2006.01) | |
| *B64C 31/02* | (2006.01) | |
| *B64C 39/04* | (2006.01) | |

(52) U.S. Cl.
CPC ............. *B64G 1/005* (2013.01); *B64C 31/02* (2013.01); *B64C 39/04* (2013.01); *B64D 3/00* (2013.01)

(58) Field of Classification Search
CPC .. B64D 3/00; B64D 3/02; B64G 1/005; B64C 2201/082
See application file for complete search history.

(56) References Cited

U.S. PATENT DOCUMENTS

| | | | | |
|---|---|---|---|---|
| 2,398,871 A * | 4/1946 | Buchal | ..................... | B64D 1/04 89/1.815 |
| 2,612,327 A * | 9/1952 | Carlson | ..................... | B64D 3/02 244/3 |
| 5,188,313 A * | 2/1993 | Piasecki | .................. | B64C 37/02 114/246 |
| 5,626,310 A | 5/1997 | Kelly | | |
| 6,029,928 A | 2/2000 | Kelly | | |
| 6,494,143 B1 * | 12/2002 | Bolonkin | .................. | B61B 7/00 104/173.1 |
| 6,913,224 B2 * | 7/2005 | Johansen | .................. | B64D 3/00 244/1 TD |
| 7,458,544 B1 * | 12/2008 | Sarigul-Klijn | ........... | B64D 1/12 244/137.3 |
| 8,262,015 B2 * | 9/2012 | Kuroda | ..................... | B64D 1/04 244/1 TD |
| 8,727,264 B1 * | 5/2014 | Rutan | ...................... | B64D 3/00 244/158.1 |
| 8,960,590 B2 * | 2/2015 | Rutan | .................... | B64G 1/005 244/1 TD |
| 2005/0067524 A1 * | 3/2005 | Johansen | ................. | B64D 3/00 244/3 |
| 2011/0024548 A1 * | 2/2011 | Kuroda | .................... | B64D 1/04 244/3 |

(Continued)

*Primary Examiner* — Joseph W Sanderson
(74) *Attorney, Agent, or Firm* — Mark Homer

(57) ABSTRACT

The invention is a system and method of air launching a powered launch vehicle into space or high altitude. More specifically, the invention is a tow aircraft which tows an unpowered glider, with the powered launch vehicle attached thereto, to launch altitude. The powered launch vehicle is released from the unpowered glider and powered on for launch.

18 Claims, 3 Drawing Sheets

(56) References Cited

U.S. PATENT DOCUMENTS

| | | | |
|---|---|---|---|
| 2014/0339371 A1* | 11/2014 | Yates .................... | B64D 39/00 244/53 R |
| 2015/0021428 A1* | 1/2015 | Rutan .................... | B64G 1/005 244/3 |
| 2016/0194080 A1* | 7/2016 | Webb ....................... | B64D 3/00 244/2 |

* cited by examiner

SYSTEM AND METHOD FOR AIR LAUNCH FROM A TOWED AIRCRAFT

RELATION TO OTHER APPLICATIONS

This application claims priority to provisional patent application 61/668,316, filed on Jul. 5, 2012, application Ser. No. 13/573,920, filed on Mar. 14, 2013, and application 62/120,590, filed Feb. 25, 2015. Applicant hereby requests these priority dates for all subject matter contained herein from said previously filed applications; said applications are also incorporated by reference herein. This application is a continuation-in-part of application Ser. No. 13/573,920 noted above. The new subject matter contained herein claims priority from provisional application 62/120,590 noted above and is embodied in claims 14-20 set forth herein.

STATEMENT OF GOVERNMENT INTEREST

The invention described herein may be manufactured and used by or for the Government of the United States of America for governmental purposes without payment of any royalties thereon or therefor.

BACKGROUND OF THE INVENTION

1. Field of the Invention

The present invention relates generally to air launching a vehicle and more particularly to air launching a powered vehicle that is attached to a glider that is modified to carry the launch vehicle which is towed by a powered aircraft.

2. Description of the Related Art

Air launch of a space or high altitude vehicles has many advantages over ground launch of such vehicles. An air launch provides for significant launch location flexibility (launch can occur near almost any location with aircraft launch capabilities) and less power is required from the launch vehicle if it can be ignited from a point higher in the atmosphere. However, significant problems associated with air launch of space or high altitude vehicles has prohibited this type of launch from becoming prevalent.

Horizontal-launching larger space vehicles or boosters from under-wing or belly-mounted aircraft is difficult as there typically is not much unobstructed room available underneath the carrier aircraft (e.g. the L-1011 or B-52) to mount the vehicle or booster.

Air launching from the top of larger, transport class aircraft that are bigger and more capable than the L-1011, such as the Boeing 747, appears attractive due to the large amounts of space to attach the vehicle. However, when top-mounting a vehicle on such an aircraft, significant safety issues related to performing the separation maneuvers from the carrier aircraft or managing an in-flight emergency where it may be necessary to quickly separate the vehicle from the carrier aircraft due to fire, or other potential catastrophic failure make this option problematic.

Another proposed approach is to tow the launch vehicle to altitude by attaching it directly to a conventional large transport airplane with a towline. This concept was demonstrated by the flights of a QF-106 towed behind a C-141A cargo plane at the National Aeronautics and Space Administration's Dryden Flight Research Center in 1997-98.

However, a problem with this approach, and also with the approaches noted above, is that they are severely limited in weight, size and shape by the constraints of existing transport aircraft. In the mated configuration, the weight of the vehicle being launched is directly limited by the payload lifting capacity of the carrier aircraft and also by fundamental geometric considerations mentioned earlier. When considering the direct-tow concept, the weight of the vehicle being launched is limited by the high drag forces imposed on the tow aircraft due to vehicle configurations generally having low aspect ratio, from aerodynamically inefficient wings.

One approach that has been explored to partially resolve this issue is disclosed in U.S. Pat. No. 6,029,928. This patent describes an orbital launch vehicle equipped with aerodynamic lifting surfaces towed behind a conventional aircraft, which, after release from the tow plane, ignites a rocket motor and flies a sub-orbital trajectory to the edge of space, whereupon a secondary, rocket propelled vehicle is released from the first vehicle. The second vehicle's rocket motor is then ignited, and the second vehicle continues on into orbit, after which the first vehicle glides back to earth for a conventional, horizontal landing. However, this approach is limited in performance as the first, winged, suborbital vehicle has to have highly swept, low-aspect ratio wings to fly at the hypersonic speeds seen during the rocket-boosted ascent, as well as having poor lifting performance in subsonic flight, thus limiting the size and lifting capability of the launch system due to the high drag forces under tow that the tow plane must overcome. As the tow plane (at any size) has a finite amount of excess thrust available, this effectively limits the overall size, weight, and launch altitude achievable by the launch system which ultimately translates into a reduced payload mass that can be placed into orbit, and at a higher launch cost.

Larger, unswept wings that were jettisoned from the first stage suborbital vehicle after it reached it's ascent flight path angle would resolve these inefficiencies, but would add significant cost and operational complexity due to their being discarded from the first stage suborbital vehicle on each flight.

This approach also lacks geometric and size flexibility because the secondary vehicle is carried to its staging point internally; development of larger secondary stages or secondary stages with different geometric configurations would likely require the development and manufacture of new, larger, winged first stage vehicles, at significant additional expense.

SUMMARY OF THE INVENTION

The invention proposed herein comprises an unpowered glider that can releasably attach a launch vehicle to the mid-section of the glider. The glider is towed to a predetermined altitude by a tow-aircraft and released. The launch vehicle can be released from the glider right before or right after it is powered, thereby allowing the launch vehicle to venture beyond the Earth's atmosphere or into high altitude.

Accordingly, it is an objective of this invention to provide an inexpensive air launch system for a powered launch vehicle.

It is another objective to provide a reusable air launch system for a powered launch vehicle.

It is yet another objective to provide a safer air launch system for a powered launch vehicle.

This invention meets these and other objectives related to air launching a launch vehicle by providing a vehicle launch system comprising an unpowered glider with a mid-section. A powered launch vehicle is releasably attached to the mid-section of the glider. A tow-aircraft is employed to tow the glider via a towline to a pre-determined altitude. The glider is designed to have a lift to drag ratio that is equal to or greater than that of the tow-aircraft so that the power required by the tow-aircraft to tow the glider to the pre-determined altitude is minimized.

When the pre-determined altitude is reached, the tow-aircraft releases the glider; the launch vehicle is powered on either before or after it is released by the glider and leaves the Earth's atmosphere. After the separate launch of the vehicle, the tow-aircraft and glider return to the ground for future use, either under tow or separately. The invention also includes a method of powered vehicle air launch using the system described herein.

BRIEF DESCRIPTION OF THE DRAWINGS

In the drawings, which are not necessarily to scale, like or corresponding parts are denoted by like or corresponding reference numerals.

DESCRIPTION OF PREFERRED EMBODIMENTS

As used herein, the phrase "launch vehicle" means a powered airborne vehicle that is meant to be launched beyond the Earth's atmosphere or to a high altitude.

The present invention is an air vehicle launch system. The system provides for airborne launch of a powered launch vehicle that is reusable, uses less power than conventional launch systems, and is flexible enough to accommodate various launch vehicles and various launch locations.

Figures 1, 2:
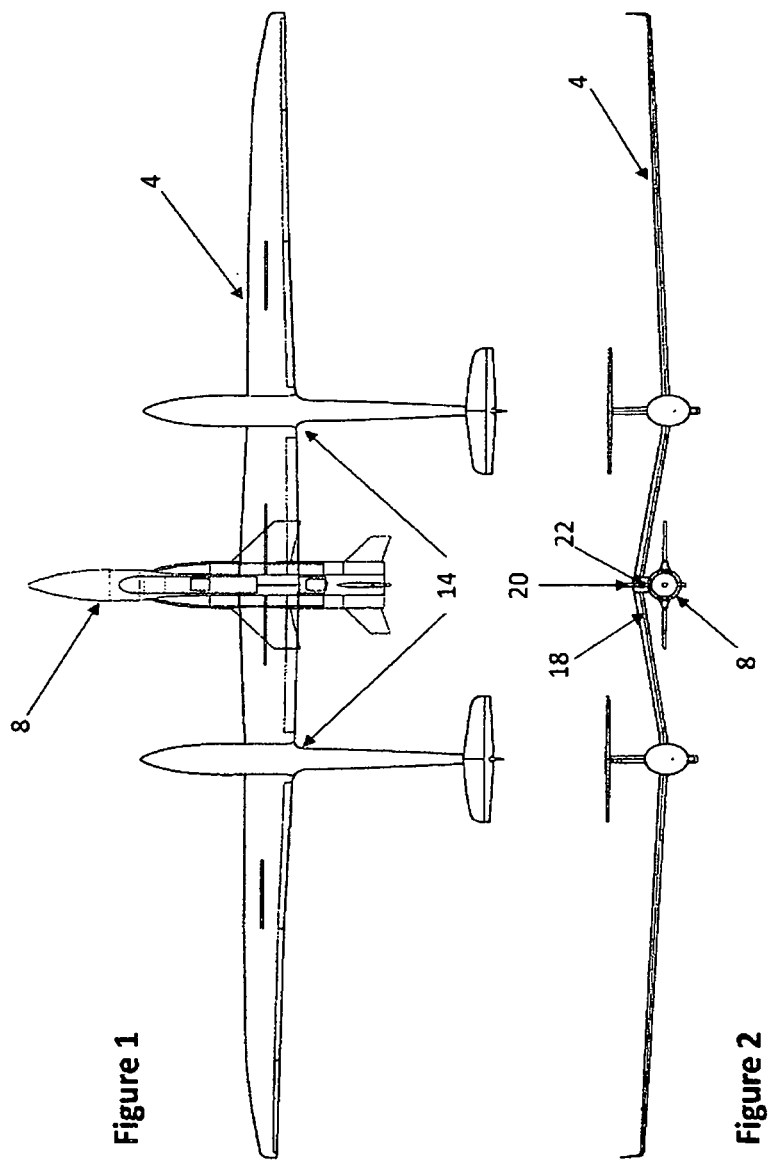
FIG. 1 depicts a top view of an embodiment of the unpowered glider and attached powered launch vehicle.
FIG. 2 depicts a rear view of an embodiment depicted in FIG. 1.
Figure 3:
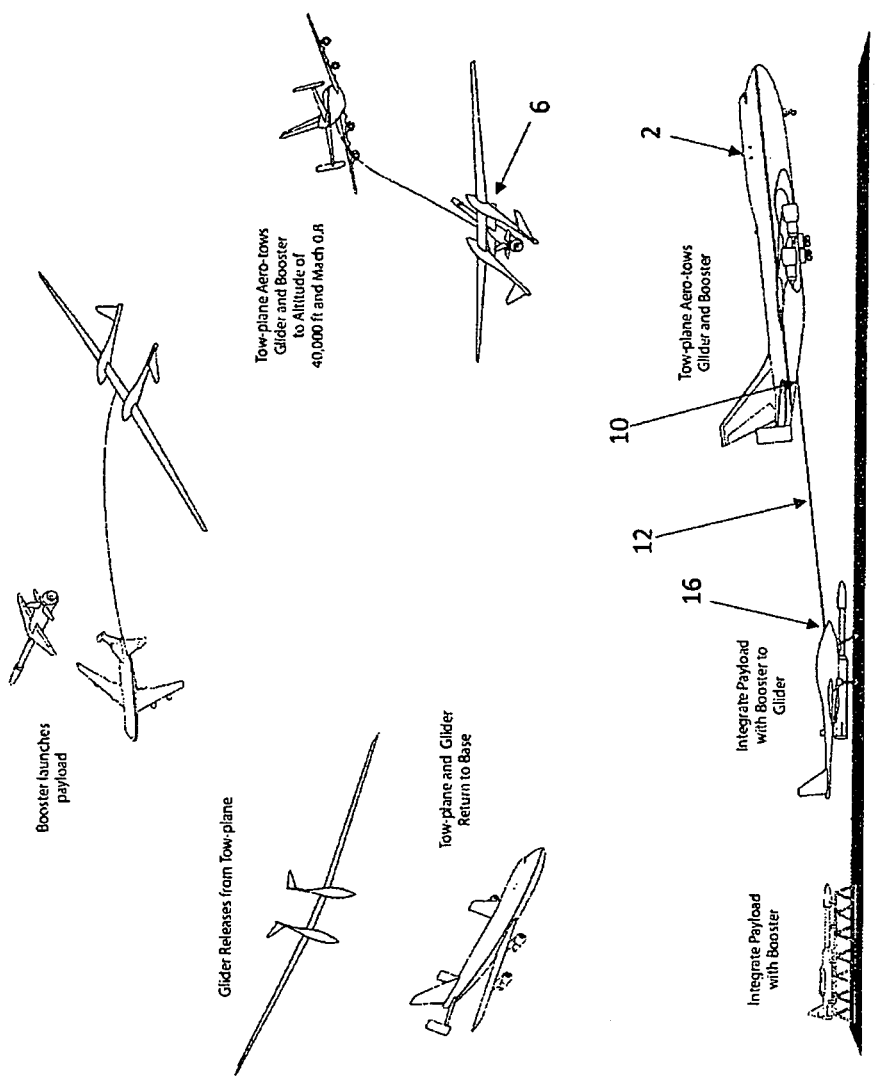
FIG. 3 depicts an embodiment of the air launch system of the present invention.

Referring to FIGS. 1-3, the system comprises an unpowered glider 4, a powered launch vehicle 8 releasably attached to the mid-section 18 of an unpowered glider 4, and a powered tow aircraft 2 with a tow line 12 between the tow aircraft and unpowered glider.

In a preferred embodiment, the unpowered glider 4 has an inverted V shape mid-section 18 in order to more easily accommodate attachment of the launch vehicle 8 to the underside thereof.

The lift to drag ratio of the unpowered glider 4 with the launch vehicle 8 attached thereto is greater than or equal to the lift to drag ratio of the tow aircraft 2 to minimize the towing power required by the tow aircraft 2.

In general, the system is employed by take-off of the tow aircraft 2 and the unpowered glider with attached launch vehicle 6, with the tow aircraft 2 towing the unpowered glider/launch vehicle 6 to a pre-determined altitude.

There are several possible airborne launch scenarios for the launch vehicle 8 once the pre-determined launch altitude is reached. The tow line 12 is released from the unpowered glider 4, the unpowered glider 4 releases the launch vehicle 8 and the launch vehicle is powered on/ignited for launch and the glider 4 glides to a runway for landing, while the tow aircraft lands normally on a runway.

In the alternative, the unpowered glider 4, releases the launch vehicle 8, which powers on/ignites for launch while the tow aircraft 2 tows the glider 4 back to the runway for landing. Another alternative is the tow line 12 is released from the unpowered glider 4, the launch vehicle 8 powers on/ignites, the unpowered glider 4 releases the launch vehicle after a desired time interval, and the glider 4 glides to a runway for landing, while the tow aircraft 2 lands normally. Other, more specific scenarios, are discussed below.

The tow plane 2 could vary in geometric size, weight, and flight envelope (airspeed and altitude capability) depending on the size of unpowered glider 4, but may make use of existing commercial and military transport aircraft such as the Boeing 747, 777, DC-10, MD-11, Lockheed L-1011, or the Air Force C-5, C-141, and C-17 transports. Larger gliders 4 to be towed aloft would require significant tow planes 2 with high specific excess thrust capabilities (15,000 to 50,000 lbs). As this class of plane typically has swept wings for flying at high subsonic climb and cruise speeds, the unpowered glider 4 would preferably utilize a similar swept-wing platform or aerodynamic configuration to match the tow plane's 2 altitude-airspeed flight envelope.

Accordingly, smaller unpowered glider/launch vehicle 6 combinations of only a few thousand pounds weight could be towed by tow planes 2 with only a few hundred pounds of specific excess thrust, such as the Scaled Composites Proteus or White Knight I. These aircraft fly at lower speeds around Mach 0.5-0.6 allowing for simpler, higher performance, unswept aerodynamic wing designs for the glider. Existing, commercially available, high-performance sailplanes could easily be modified into twin fuselage configurations for launching launch vehicles 8 in this size and class.

Even smaller gliders 4 carrying launch vehicles 8 being flown for sub-orbital research that weigh only a few hundred pounds could be towed behind propeller driven airplanes commonly found in general aviation such as Cessna 210's, Beechcraft Bonanza's, or military trainers such as the T-34 and the Embraer EMB-312 Tucano.

Regardless of size, the tow planes 2 would be outfitted with a releasable tow hook system 10 similar in function to that used with manned sailplanes when towing them to altitude for sport and recreation flying. The releasable tow hook system 10 would be used to release the unpowered glider 4 from the tow plane 2 in the event the unpowered glider 4 was unable to disconnect from the tow line 12 with the release mechanism 16 on the unpowered glider 4, further discussed below.

The tow plane 2 would be piloted by an on-board flight crew, and in the larger aircraft the tow systems could be managed from an on-board Launch Control Operator station for managing the launch systems inherent with the larger, heavier, more complex glider/launch vehicle systems 6. Larger transports may also feature an on-board control station for remotely piloting or operating the unpowered glider 4 from the tow plane 2 allowing for portable range operations independent of fixed ground assets.

As noted above, the unpowered glider 4 preferably includes an inverted-V cranked center wing section 18 for maximum ground clearance and to minimize landing gear length (which provides increased structural efficiency). The unpowered glider 4 may be in a twin fuselage 14 configuration with a partial center fuselage 20 designed to provide for multiple structural attachment points 22 for carrying the launch vehicle 8 and transferring the structural loads onto the glider's 4 primary structure. The structural attachment points 22 could include a bracket which, in itself, is releasably attached to the partial center fuselage 20 in case the attachment points 22 themselves do not release the launch vehicle 8 (the bracket, as a whole, can be released for safety purposes). However, a single fuselage 14 configuration may be utilized for smaller launch vehicles 8 that can be easily integrated into, or carried under, the bottom of the glider 4 fuselage 14.

While the glider 4 has no propulsion means, it may include onboard batteries to operate onboard glider systems (hence, when describing the glider as "unpowered", the term relates only to propulsion means).

The glider 4 would be designed for high lift/drag aerodynamic efficiency while being towed to/at altitude with the space vehicle 8 attached, or by itself; and also in free-gliding flight, with and without the launch vehicle 8 attached. The lift/drag ratio of the glider 4 with the launch vehicle 8 integrated onto it should be at least equivalent to the tow-plane's 2 lift/drag ratio, preferably, the lift/drag ratio of the glider/launch vehicle combination 6 is about 17:1 or greater. Without the launch vehicle 8 attached, the lift/drag ratio may be as high as 35:1.

The glider's 4 structural weight fraction as compared to the launch vehicle 8 preferably is on the order of 2:1, where the space vehicle 8 could weigh up to twice that of the glider 4, with appropriate structural margins for maneuvering and wind gusts at the expected maximum gross take-off weight.

In larger configurations (approaching 300 foot wing span) the glider 4 may feature a tandem wing design to keep the glider's overall span at a manageable size for operating from existing airports and also to minimize the impact on a single load-carrying wing spar due to the high wind bending loads of the non-span loading configuration. A tandem wing design may allow for the wing bending loads to be shared across two wing spars resulting in a lighter overall structural weight. It might also allow for greater options for attachment point locations between the glider 4 and the launch vehicle 8.

The unpowered glider (with integrated launch vehicle) 6 may be remotely-piloted or flown/operated from a ground control station by the pilot/operator either through an onboard autopilot system with an autonomous system backup capability, or with an air-crew physically on board the glider 4, depending on the volatility of the propellant system of the rocket booster being carried and air launched (for aircrew safety reasons). Flights with an air-crew physically on-board the unpowered glider 4 would necessitate the addition of a rocket-based zero-zero ejection seat system to allow for rapid egress of the air-crew in the event of an emergency, either in flight or while on the ground.

The tow line 12 may be fabricated from a light-weight, high-strength material such as Vectran, sold by the Kuraray Co., and may be a single line configuration connected to the aft fuselage or the center belly of the tow plane 2 and the forward most location of the glider 4 center fuselage with a single release hook mechanism, or a twin-bridle Y configuration connected near where the glider 4 center-wing root airfoil interfaces with each fuselage 14. In both cases there would be separate, independent, mechanical release mechanisms 10, 16 at each connection of the tow line 12 to each airplane 2, 4, with provisions for separating the mechanical release mechanism 10, 16 brackets from the aircraft explosively in the event of (a) release mechanism 10, 16 failure(s). Smaller tow plane/towed-glider launch systems could use commercially available, highly reliable, pyrotechnic based guillotine-type, cable cutters (commonly used for the controlled, sequenced reefing of high-performance parachute systems) in lieu of explosive bolts to sever the tow line 12 in the event of a failed release of the glider 4 from the tow line 12.

The tow line 12 may also feature a structural frangible link component designed to fail and separate the glider/launch vehicle combination 6 from the tow plane 2 in the event the tow forces exceeded safe load limits, upon which point the glider/launch vehicle booster 6 would fly to a controlled landing at a location within safe gliding distance from the point of separation.

The launch vehicle 8, as noted above, is a powered air vehicle that would be launched either into space or high altitudes. Some examples of launch vehicles 8 of the invention include rocket boosters for launching payloads into earth orbit; suborbital rocket boosters for carrying science payloads and experimental instruments to high altitudes and back; aeronautic test vehicles (e.g. rocket-powered boost-glide lifting bodies (HL-10, X-24A, HL-20); rocket-powered hypersonic test vehicles (X-15, HTV-2, X-51); air-launch glide vehicles (X-40A and X-37); air-launch research aircraft (HiMat, DAST, F-15 SRV); or inert drop tests (Space Shuttle SRB parachute recovery tests) may also be carried aloft and released for aeronautical research purposes.

Launch vehicles 8 of the present invention range from being controlled by an on-board pilot, flown remotely (piloted from a ground control station), or being fully autonomous. Propulsion systems utilized in launch vehicles 8 of the invention include rocket motors (solid or liquid propellant based), air-breathing motors, or a combination of both.

The launch vehicle 8 to glider 4 attachment/release mechanism is understood by those in the art to be sufficient to provide structural integrity for the attachment between the two craft 4, 8 and provide the ability to release the launch vehicle 8, from the glider 4 at a desired altitude.

Below are some preferred examples of the attachment/release mechanisms that may be employed for the present invention.

A releasable mechanical hook mechanism extending below the bottom of the towed-glider center fuselage 20, or mated location of the towed-glider/launch vehicle 6 interface, engaging a single carry-pin that is located in a small cavity recessed into the outer-mold line/skin of the launch vehicle 8 such that when separated from the towed-glider 4 the pin is not directly exposed to aerodynamic flow or the extreme heating associated with the hypersonic flow encountered in launch vehicle 8 ascent trajectories. Larger launch vehicles 8 would use multiple attachment hook/pin combinations to resolve the structural attachment loads back into the towed-glider's 4 primary load carrying structure. Orbital Science's Pegasus launch vehicle uses four attachment hook/pin mechanisms that are similar in function to that described herein and similar configurations could be used for attachment/release mechanisms for the present invention.

An alternate embodiment for attaching/releasing the launch vehicle 8 to the towed-glider 4 is through the use of a support cradle (not depicted) designed to limit the movement of the launch vehicle 8, and would utilize a series of load bearing straps that could, in the case of a bottom-mounted launch vehicle 8, secure the launch vehicle 8 to the cradle while resolving the launch vehicle's 8 loads back into the towed-glider's 4 primary load carrying structure. This attachment method may also be applicable to a top-mounted launch vehicle 8 where the cradle could provide structural support to the launch vehicle 8 and the straps would primarily be used to stabilize the launch vehicle 8 in place in the cradle during mated flight to the intended release point.

In both cases the straps could be released through the use of dual, high-reliability, pyrotechnic bolts located on each end of the straps. If bottom mounted, the launch vehicle 8 could fall away from beneath the towed-glider 4 when the straps were released, or if top-mounted, the towed-glider 4 could maneuver away from the now free-flying launch vehicle 8 after release. Once the launch vehicle 8 was a safe distance away from the towed-glider 4 the propulsion system of the launch vehicle 8 would be initiated.

Sway-braces (not depicted) may also be employed to limit the attached launch vehicle's 8 lateral movement for those cases where it is desirable to have the attachment/release mechanisms aligned with each other along a single line oriented parallel to the center line of the launch vehicle 8.

Following is a description of the general operation of the invention. The tow plane would line up on the runway with the tow line connecting the unpowered glider/launch vehicle combination. The tow plane would be piloted by an on-board flight crew; the towed-glider may be flown either remotely-piloted with an autonomous system backup capability, or with an air-crew physically on board the glider, depending on the volatility of the propellant system of the rocket booster being carried and air launched (for aircrew safety reasons).

The tow plane would slowly taxi in place to take up any slack in the tow line before adding power for takeoff. The unpowered glider would modulate its flap and drag brake settings in order to coordinate a simultaneous lift off of the glider (to mitigate the risk of an aborted takeoff as described below) with the tow plane at which time the glider would position itself in either a high tow or a low tow position for the climb to altitude for launch. In the event of an aborted take-off by the tow plane, the glider could immediately release the tow line from the glider, deploy maximum speed brakes/spoilers, apply maximum braking, deploy an optional drogue chute from the rear of the glider to add additional braking force, and steer clear of the tow plane if needed. After takeoff the tow plane with the unpowered glider/launch vehicle in trail would climb to altitude following the most efficient climb profile available.

Once at the desired altitude the unpowered glider/launch vehicle combination would either:

a. Release from the tow line in order to give the tow plane time to maneuver a safe distance away for release and ignition of the launch vehicle to begin its ascent trajectory. In the event of an aborted launch attempt after release of the tow line, the glider/launch vehicle can glide back to a predetermined landing/recovery point where the glider would execute a safe landing on a runway. Alternatively, the tow line may be reattached to the unpowered glider by "flying" the tow line attachment link to the attachment point on the glider as a small autonomous, unmanned-aerial-vehicle, and reconnecting it to the glider using closed-loop guidance and control algorithms. Then tow plane could tow the glider back to a predetermined landing/recovery point where the glider would be released to execute a safe landing.

b. Releasing the launch vehicle from the glider and igniting the propulsion system after the launch vehicle has fallen a sufficient distance such that it cannot physically contact or endanger the tow plane or the unpowered glider regardless of the possible failure combinations of the launch vehicle's flight control and/or propulsion systems. Once the launch vehicle is clear of the area, the tow plane could tow the glider back to a predetermined landing/recovery point where the glider would be released to execute a safe landing.

There are numerous options for maneuvering the tow plane, glider, and launch vehicle for optimally launching the vehicle, depending on the type of launch desired. These would include methods of maneuvering so that the launch vehicle is at a desired angle (or trajectory) to the ground before ignition to provide for optimal launch into orbit. Some preferred examples are described below.

a. A winged-booster with a high aspect ratio, high lift/drag ratio wing is released from the glider in level flight, the booster motor is ignited and a pull-up maneuver is initiated to a desired flight path angle, at which time the wing is separated from the booster (the wing may be recovered for reuse either through the use of a recovery parachute, or via controlled flight to a ground recovery with an autonomous autopilot system).

b. From level, towed flight, the tow plane initiates a shallow dive (or diving turn), adding energy to the towed-glider/rocket combination. Using this additional energy the glider initiates an accelerated pull-up maneuver to a desired flight path angle, releases the booster from the glider and the booster motor is ignited. The glider then executes a pitch or pitch/roll combination maneuver to return to level flight. During the pull-up maneuver the tow force increases causing the tow-plane to decelerate as energy is transferred to the glider.

c. The towed glider is towed high, released from tow, the glider performs a longitudinal dive and subsequent pull-up energy maneuver to a desired flight path angle, whereupon the booster is released from the glider and the booster motor is ignited. The glider then executes a pitch or pitch/roll combination maneuver to return to level flight.

d. The towed glider is towed high, released from tow, from level flight the glider performs a longitudinal pull-up maneuver to a desired flight path angle, whereupon the booster is released from the glider and the booster motor is ignited. The glider then executes a pitch or pitch/roll combination maneuver to return to level flight.

e. The towed glider is released from tow in level flight, the booster motor is ignited while attached to the glider, the booster/glider combination executes a pull-up maneuver to a desired flight path angle whereupon the booster is released from the glider. The glider then executes a pitch or pitch/roll combination maneuver to return to level flight.

f. The towed glider is released from tow in level flight, a small rocket motor attached to the glider is ignited adding additional energy allowing the booster/glider combination to execute a pull-up maneuver to a desired flight path angle whereupon the booster is released from the glider and the booster motor is ignited. The glider then executes a pitch or pitch/roll combination maneuver to return to level flight.

g. From level towed flight, the towed glider releases a rocket booster with a small parachute to reposition the booster's attitude to a nose up attitude whereupon the parachute is released from the booster and the booster motor is ignited.

Upon reaching the predetermined landing/recovery point the glider is released from the tow line (if still under tow), whereupon it is flown to an unpowered, but otherwise normal, full stop landing on the runway. Once the glider (with the launch vehicle potentially still attached due to an aborted launch or the like) is recovered from the runway, the tow plane executes a normal powered landing. In the event of a landing mishap involving the glider/launch vehicle rendering the runway unavailable for a period of time, or if the recovery of the glider/launch vehicle from the runway is unexpectedly delayed, the tow plane may land at a predetermined, alternate runway location.

Figure 4:
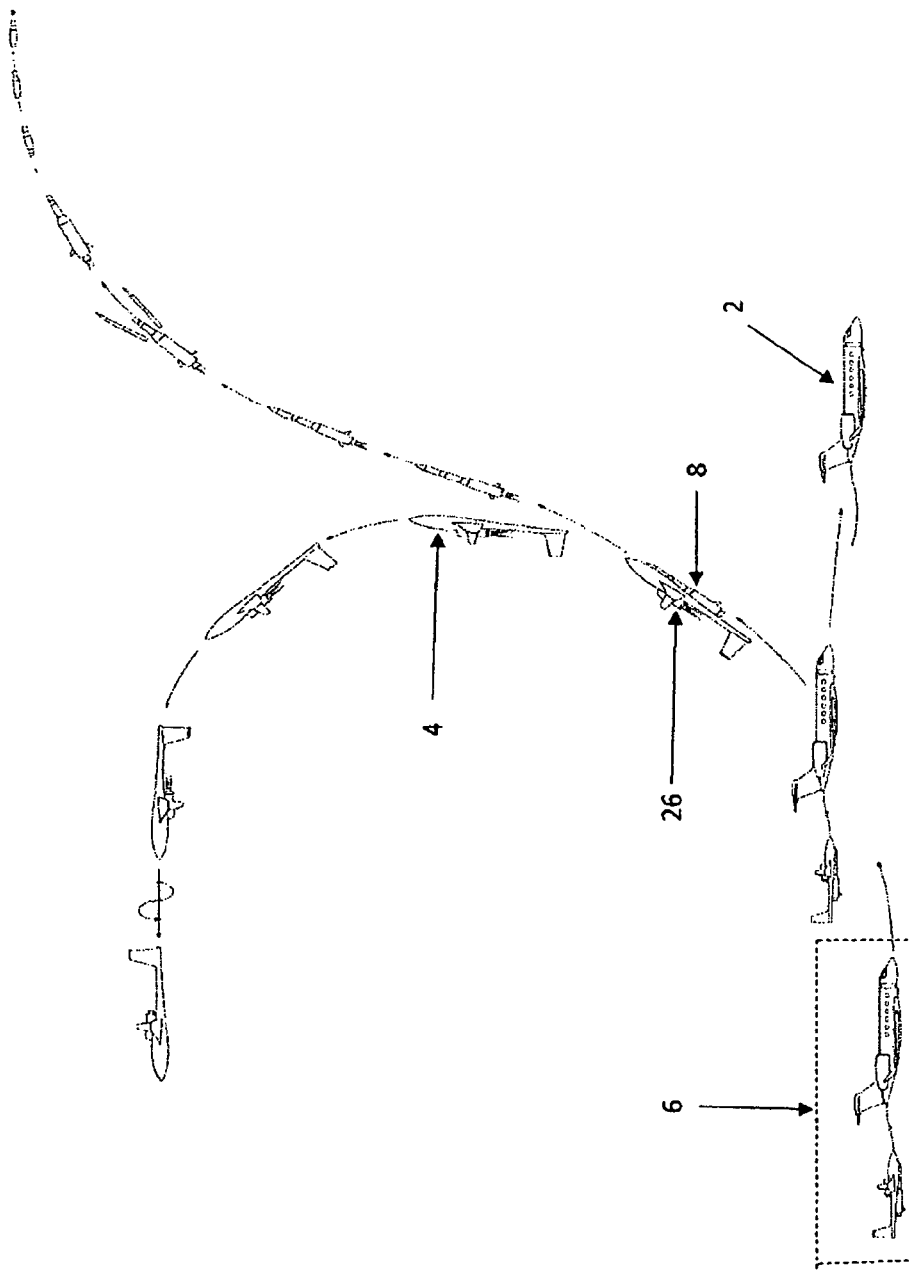
FIG. 4 depicts an embodiment of the air launch system of the present invention that includes a sustainer motor attached to the glider.

Referring to FIG. 4, an embodiment of the present invention is depicted that includes a sustainer motor 26 attached to the glider 4 that provides certain advantages for launching the launch vehicle 8 from a completely unpowered glider 4 as discussed below.

Using an unpowered glider 4 as discussed above results in a quasi-steady, level flight of the glider 4 which results in a relatively low flight path angle for release of the launch vehicle 8 from the glider 4. Employing a sustainer rocket motor 26 attached to the glider 4 allows for releasing the launch vehicle 8 at an elevated flight path angle from the glider 4. This may result in a performance advantage of 30% or greater in terms of additional payload mass to orbit, or the same payload mass to orbit may be accomplished from a smaller launch vehicle 8.

In addition, the launch vehicle 8 can be simpler, lighter, less expensive, and more reliable than launch vehicles 8 designed to perform the pull-up maneuver after a more horizontal release from the tow aircraft 2. This is because the launch vehicle 8 would not require wings or inefficient lifting surfaces to perform a pull-up maneuver to launch a payload, with resulting adverse impacts on the launch vehicle 8 performance due to the additional weight and aerodynamic drag of the aerodynamic lifting surfaces.

Further, releasing the launch vehicle 8 at the optimal flight path angle allows for the use of proven, low cost, lightweight, low authority control effectors for first stage guidance and control such as cold gas injection plume biasing or reaction control systems. This approach eliminates the need for, and the complexity of expensive gimbaled nozzles, and movable fin, actuator-based flight control systems.

Finally, this embodiment of the invention may include a remotely-piloted glider system allowing the required separation distance between the glider 4 and the launch vehicle 8 before launch vehicle 8 rocket motor ignition can be kept to a minimum, limited only by the launch vehicle's 8 plume impingement distance on the glider 4. This allows for launch vehicle 8 rocket motor ignition to occur within 2-3 seconds after release, whereas crewed carrier aircraft require safe separation distances of 5 seconds and 1000 feet or more before launch vehicle 8 ignition. The shorter delay time before ignition minimizes dispersions in capturing the intended flight path angle, maximizing performance.

In a preferred embodiment, the sustainer rocket motor 26 would be mounted at the aft end of the center partial fuselage of the glider 4 (that the launch vehicle 8 is attached to), and may be angled slightly to align the rocket motor's thrust line with the combined glider/launch vehicle's 6 center-of-gravity. This may be necessary to minimize the amount of longitudinal pitch trim required to control the glider/launch vehicle 6 while the sustainer rocket motor is propelling the glider/launch vehicle 6 through the pull-up maneuver.

The sustainer rocket motor 26 may comprise several different types of rocket motors (liquid, solid, or hybrid) or a combination of multiple rocket motors as set forth below:
1) A single, throttleable motor with variable thrust ranging from 5% of maximum to 100%.
2) Multiple, non-throttleable motors, ignited in series, or in parallel (overlapping in burn duration), to approximate the thrust required to propel the glider 4 though the intended pull-up maneuver.
3) A single, non-throttable motor with a preconfigured thrust curve tailored to approximate the thrust required to propel the glider though the intended pull-up maneuver.

In addition, the sustainer rocket motor may have the following attributes: maximum thrust approximately equal to the takeoff weight of the glider 4 with the launch vehicle 8 attached (1:1 thrust-to-weight ratio); throttability ranging from 5% of maximum thrust to 100%; reusability allowing the motor to be used on multiple flights before requiring significant refurbishment or replacement; and, the ability to be restarted one or more times in flight to allow the glider 4 to regain altitude quickly, thereby extending the glider's 4 gliding distance after an attempted or aborted launch.

A preferred example of operating the invention including a sustainer motor 26 is set forth below:
1. The glider (with launch vehicle attached) is towed by a tow plane to altitude.
2. In level flight the glider (with launch vehicle attached) is released from the tow line and the tow plane turns to clear the area in front of the glider.
3. The sustainer rocket motor on the glider is ignited and the glider (with launch vehicle attached) initiates a constant-g, constant airspeed, pull-up maneuver to a predetermined flight path angle. As the flight path angle increases the thrust of the sustainer motor is increased proportionately to maintain the airspeed of the glider/launch vehicle combination.
4. Once the glider (with launch vehicle attached) reaches the desired flight path angle, the launch vehicle is released from the glider and the launch vehicle rocket motor is ignited for ascent.
5. The launch vehicle departs the area, accelerating along its intended orbital/sub-orbital trajectory.
6. After release of the launch vehicle the sustainer motor for the glider is shut off and the glider completes a rolling pull-up (or push-over) maneuver to upright level flight.
7. The glider glides back to its designated landing location for servicing and preparation to support another launch.
8. Additional rocket propellant could be reserved on the glider to allow the sustainer motor to be restarted (if the sustainer rocket motor on the glider is restartable), allowing the glider to perform additional pull-up maneuvers, regaining altitude each time, thereby extending the gliding distance and the operational range of the vehicle.
9. In the event of an aborted launch, the launch vehicle would not be released from the glider, the sustainer motor would continue to propel the glider/launch vehicle through the rolling pull-up (or push-over) maneuver to upright level flight (with the launch vehicle attached to the glider). The glider/launch vehicle would then glide back to its designated landing location for recovery and post flight processing of the launch vehicle.

What is described herein are specific examples of many possible variations on the same invention and are not intended in a limiting sense. The claimed invention can be practiced using other variations not specifically described above.

What is claimed is:
1. A vehicle air launch system, comprising:
an unpowered glider, having a first lift to drag ratio, comprising:

a mid-section having first and second ends; and,
attachment means, located on the mid-section;
a powered launch vehicle, releasably attached to the mid-section via the attachment means;
a powered tow-aircraft, having a lift to drag ratio less than or equal to the first lift to drag ratio, capable of towing the unpowered glider and attached powered launch vehicle to a pre-determined altitude; and
a towline releasably attached to the powered tow-aircraft and the unpowered glider so that the towline may be detached from the unpowered glider at the pre-determined altitude, a control system configured to increase the flight path angle of the unpowered glider, wherein the powered launch vehicle is detached from the unpowered glider and powered on at a second pre-determined altitude and a desired, increased flight path angle at a pre-determined time.

2. The air vehicle launch system of claim 1, wherein the mid-section of the unpowered glider comprises an inverted V shape and the attachment means are located on an underside thereof.

3. The air vehicle launch system of claim 1, wherein the unpowered glider further comprises twin fuselages located at the first and second ends.

4. The air vehicle launch system of claim 1, wherein the tow aircraft and unpowered glider each comprise a swept wing design.

5. The air vehicle launch system of claim 1, wherein the unpowered glider further comprises a center fuselage, located on an underside of an inverted V shape mid-section wherein the attachment means are located on an underside of the center fuselage.

6. The air vehicle launch system of claim 5, wherein the attachment means include a bracket, having releasable structural attachment points thereon, releasably attached to the center fuselage.

7. The air vehicle system of claim 1, wherein the unpowered glider comprises a weight of about one-half of a weight of the launch vehicle.

8. The air vehicle launch system of claim 1, wherein the launch vehicle is selected from the group of rocket boosters to launch payloads into Earth's orbit, sub-orbital rocket boosters for carrying science payloads and experimental instruments to high altitudes and back, rocket powered hypersonic test vehicles, air-launch glide vehicles, air-launch research vehicles, and inert drop tests.

9. The vehicle air launch system of claim 1, further comprising a sustainer motor attached to the unpowered glider to assist in increasing the flight path angle of the unpowered glider to the desired, increased flight path angle.

10. The vehicle air launch system of claim 9, wherein the sustainer motor is attached to an aft end of a center partial fuselage of the glider.

11. The air launch vehicle system of claim 10, wherein the sustainer motor is attached to align a thrust line of the sustainer motor with a center of gravity of the air vehicle launch system.

12. The air launch vehicle system of claim 9, wherein the sustainer motor comprises a maximum thrust equal to or greater than the combined weight of the glider and the launch vehicle.

13. The air launch vehicle system of claim 9, wherein the sustainer motor comprises a single, throttleable motor with variable thrust ranging from 5% of maximum to 100%.

14. A method of launching a launch vehicle, comprising the steps of:
providing a powered tow aircraft, attached via a tow line to an unpowered glider, a launch vehicle, releasably attached to the underside of the unpowered glider;
towing the unpowered glider and attached launch vehicle via the powered tow aircraft to a desired altitude and a desired elevated flight path angle at a desired speed;
releasing the tow line from the unpowered glider;
increasing the flight path angle of the unpowered glider through a pull-up maneuver;
releasing the launch vehicle from the unpowered glider; and,
powering on the launch vehicle.

15. The method of launching of claim 14, further comprising the step of returning the unpowered glider and tow aircraft to the ground.

16. The method of launching a launch vehicle of claim 14, further comprising a sustainer motor attached to the glider to assist in increasing the glider flight path angle prior to the step of releasing the launch vehicle.

17. A method of launching a launch vehicle, comprising the steps of:
providing a powered tow aircraft, attached via a tow line to an unpowered glider, a launch vehicle, releasably attached to the underside of the unpowered glider;
towing the unpowered glider and attached launch vehicle via the powered tow aircraft to a desired altitude;
increasing the flight path angle of the unpowered glider and attached launch vehicle through a pull-up maneuver;
releasing the launch vehicle from the unpowered glider; and,
powering on the launch vehicle.

18. The method of launching of claim 17, further comprising the step of the tow aircraft towing the unpowered glider to a landing location.

* * * * *